United States Patent [19]

Wu

[11] Patent Number: 5,727,862
[45] Date of Patent: Mar. 17, 1998

[54] LED BACK LIGHT ASSEMBLY

[75] Inventor: Wen-Ching Wu, Taipei Hsien, Taiwan

[73] Assignee: Taiwan Liton Electronic Co., Ltd., Taipei, Taiwan

[21] Appl. No.: 755,608

[22] Filed: Nov. 25, 1996

[51] Int. Cl.$^6$ .................................................. F21V 8/00
[52] U.S. Cl. ............................ 362/27; 362/26; 362/31
[58] Field of Search ................................ 362/26, 27, 31, 362/326, 330, 333, 800

[56] References Cited

U.S. PATENT DOCUMENTS

| | | | |
|---|---|---|---|
| 2,623,313 | 12/1952 | Fuchs | 362/27 |
| 5,276,591 | 1/1994 | Hegarty | 362/31 |
| 5,280,415 | 1/1994 | Barnette | 362/27 |

Primary Examiner—Y My Quach
Attorney, Agent, or Firm—Beveridge, DeGrandi, Weilacher & Young, LLP

[57] ABSTRACT

A LED back light assembly including a light guide and a circuit board with light emitting diodes mounted within a base frame and covered by an opaque diffuser plate, wherein the light guide has a frosted top face, a frosted bottom face, a corrugated bright front face facing the light emitting diodes, two end flanges respectively coupled to upright pins at two opposite ends of the base frame, and two transverse bevel faces at two opposite ends below said end flanges adapted for guiding back diffused light rays, the corrugated bright front face defining a plurality of longitudinally arranged furrows, which receive the light emitting diodes of the circuit board respectively.

2 Claims, 5 Drawing Sheets

LED BACK LIGHT ASSEMBLY

BACKGROUND OF THE INVENTION

The present invention relates to a LED back light assembly for electric home appliances for function display, and more particularly to such a LED back light assembly which permits light to be evenly distributed through the light emitting face.

Regular electric home appliances are commonly equipped with a function display window and a LED back light assembly in the function display window for function display. A LED back light assembly for this purpose has a light guide for guiding light to the desired direction. This light guide has a smooth, transparent front side and a smooth, transparent back side. In order to achieve a better light diffusion effect, the light guide shall be secondarily processed to form lines at the front side. This secondary processing process greatly increases the manufacturing cost of the LED back light assembly. During the secondary processing process, dust will be produced.

SUMMARY OF THE INVENTION

The present invention has been accomplished to provide a LED back light assembly which eliminates the aforesaid drawbacks. It is one object of the present invention to provide a LED back light assembly which is easy and inexpensive to manufacture. It is another object of the present invention to provide a LED back light assembly which achieves a satisfactory light diffusion effect so that less amount of light emitting diodes is needed. According to the preferred embodiment of the present invention, the LED back light assembly comprises a light guide and a circuit board with light emitting diodes mounted within a base frame and covered by an opaque diffuser plate. The light guide has a frosted top face, a frosted bottom face, a corrugated bright front face facing the light emitting diodes, two end flanges respectively coupled to upright pins at two opposite ends of the base frame, and two transverse bevel faces at two opposite ends below said end flanges adapted for guiding back diffused light rays, the corrugated bright front face defining a plurality of longitudinally arranged furrows, which receive the light emitting diodes of the circuit board respectively.

DETAILED DESCRIPTION OF THE PREFERRED EMBODIMENT

Figure 1:
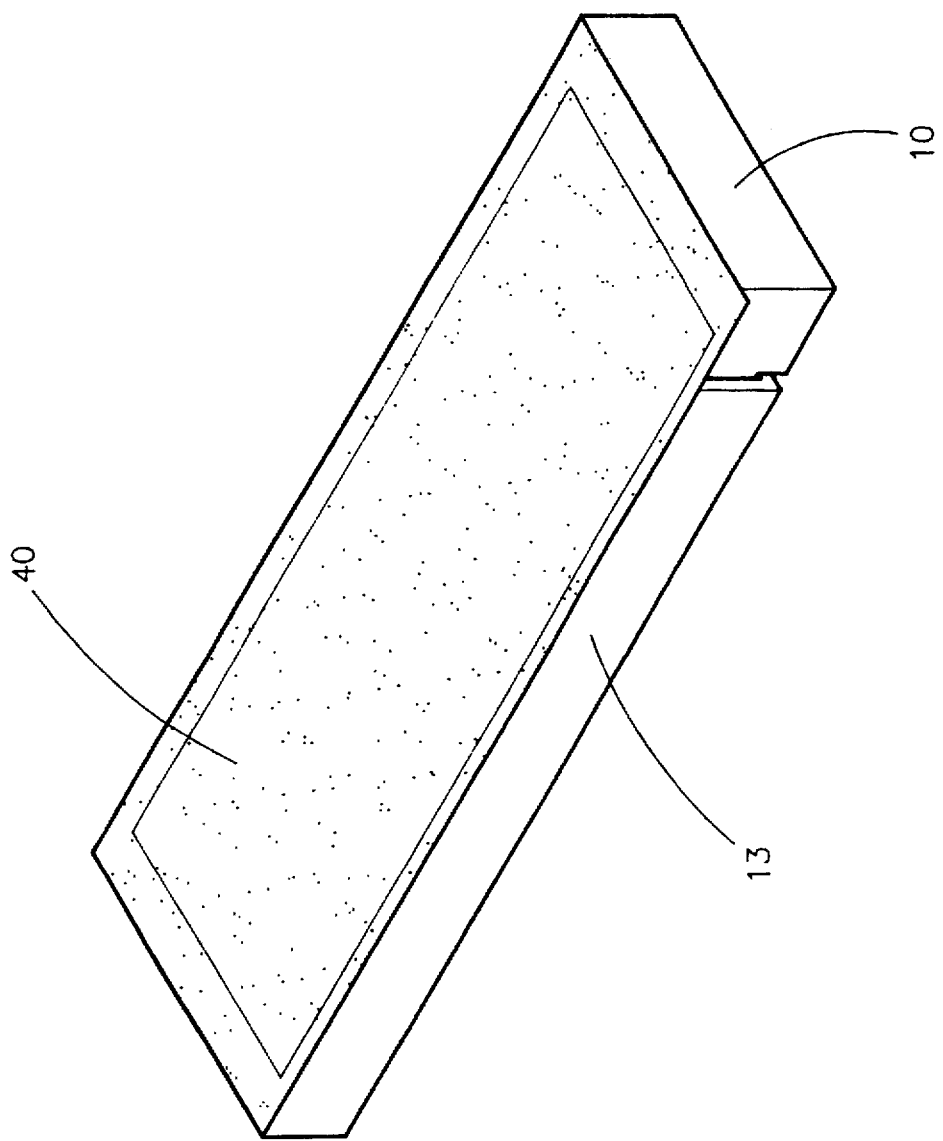
FIG. 1 is an elevational view of a LED back light assembly according to the present invention.
Figure 2:
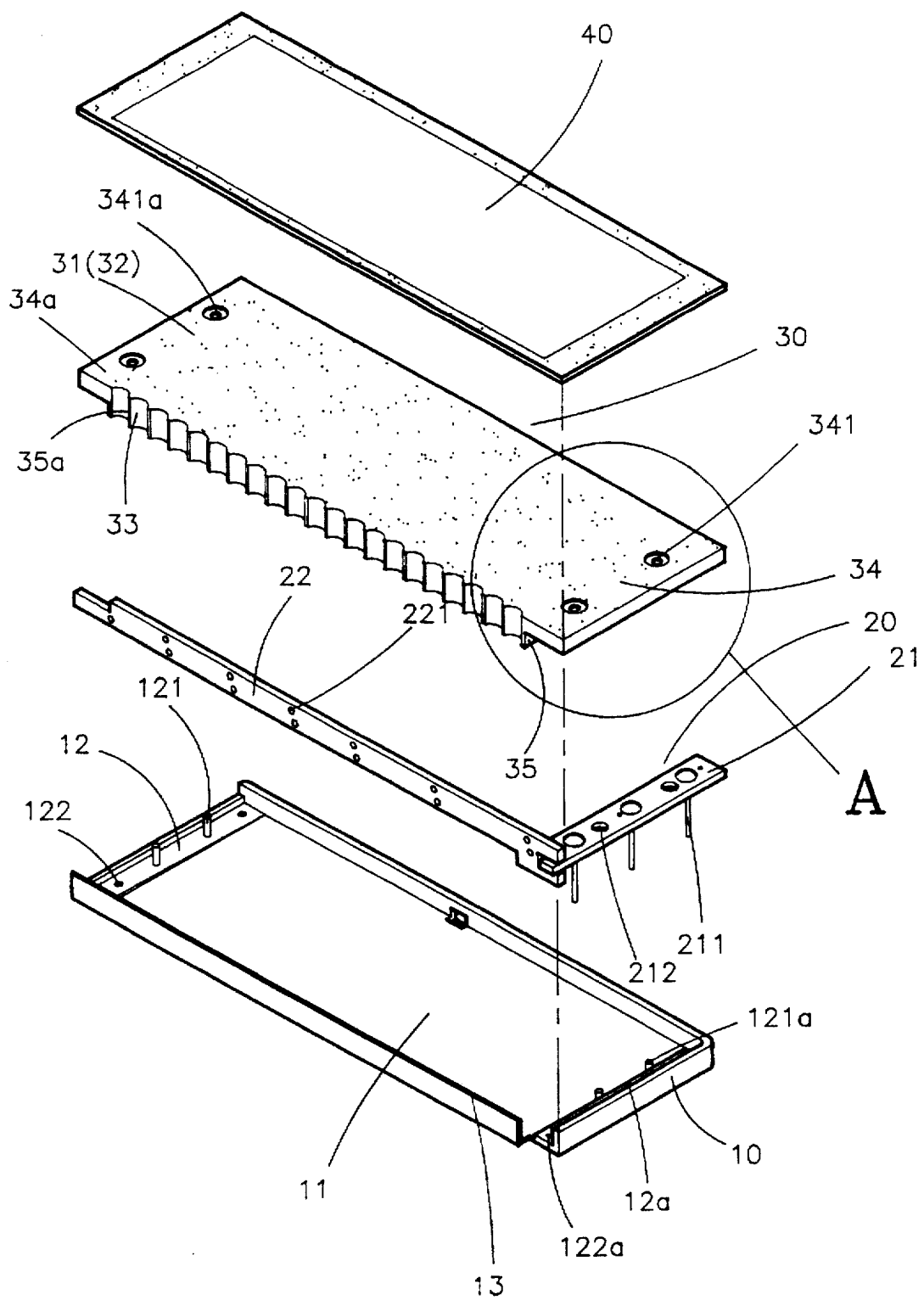
FIG. 2 is an exploded view of the LED back light assembly shown in FIG. 1.
Figure 2A:
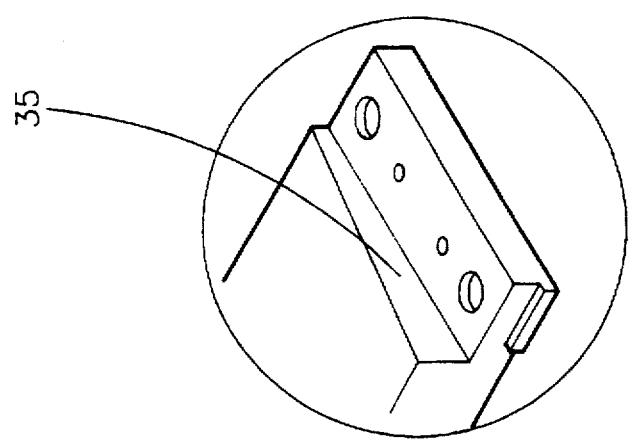
FIG. 2A is an enlarged view of a part of FIG. 2, showing the structure of the transverse bevel face.

Referring to FIGS. 1 and 2, a LED back light assembly in accordance with the present invention, is generally comprised of a substantially rectangular base frame 10, a circuit board 20, a light guide 30, and a diffuser plate 40.

The base frame 10 comprises a flat receiving chamber 11, and two end flanges, namely, the first end flange 12 and the second end flange 12a, and two side flanges 13 respectively extended from the four sides thereof around the flat receiving chamber 11. The end flanges 12, 12a have respective upright pins 121, 121a and pin holes 122, 122a adapted for holding the circuit board 20 and the light guide 30 in the receiving chamber 11.

The circuit board 20 is comprised of a first circuit board section 21 and a second circuit board section 22 connected at right angles. The first circuit board section 21 has a plurality of terminals 211 respectively plugged into the pin holes 122a of the second end flange 12a of the base frame 10, a plurality of pin holes 212 respectively coupled to the upright pins 121a of the second end flange 12a. The second circuit board section 22 is attached to one side flange 13 of the base frame 10, having a plurality of light emitting diodes 221.

The light guide 30 fits the receiving chamber 11 of the base frame 10, comprising a frosted top face 31, a frosted bottom face 32, a corrugated bright front face 33 facing the light emitting diodes 221 of the circuit board 20, two end flanges 34, 34a, having respective pin holes 341, 341a respectively coupled to the upright pins 121a, 121 of the base frame 10, and two transverse bevel faces 35, 35a at two opposite ends below the end flanges 34, 34a adapted for guiding back diffused light rays, so that light is evenly distributed through the light emitting area. The corrugated bright front face 33 defines a plurality of longitudinally arranged furrows which receive the light emitting diodes 221 respectively.

The diffuser plate 40 is an opaque plate covered on the base frame 10 over the light guide, and adapted for diffusing light through the light emitting side.

Figure 3:
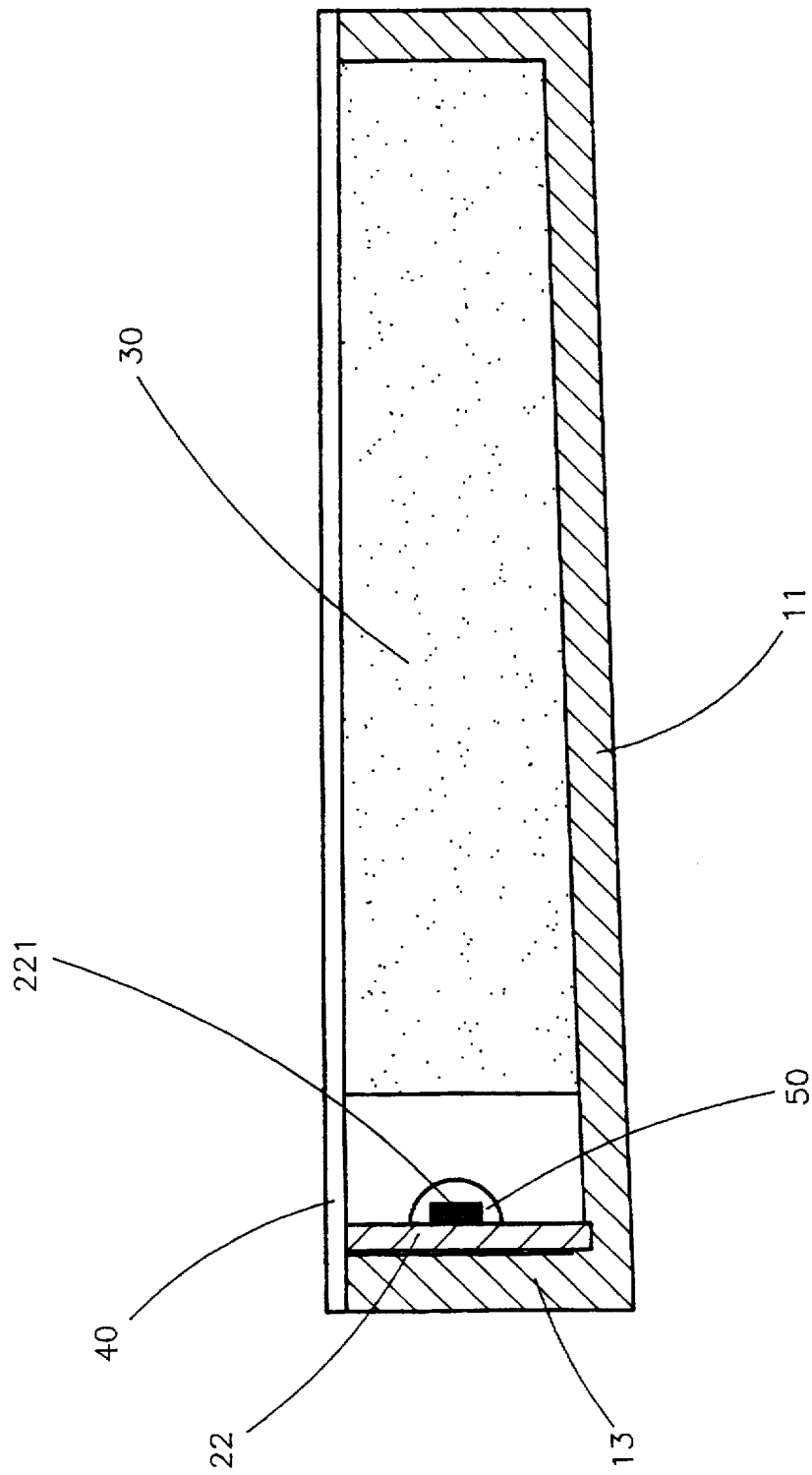
FIG. 3 is a side view in section of the LED back light assembly shown in FIG. 1.
Figure 4:
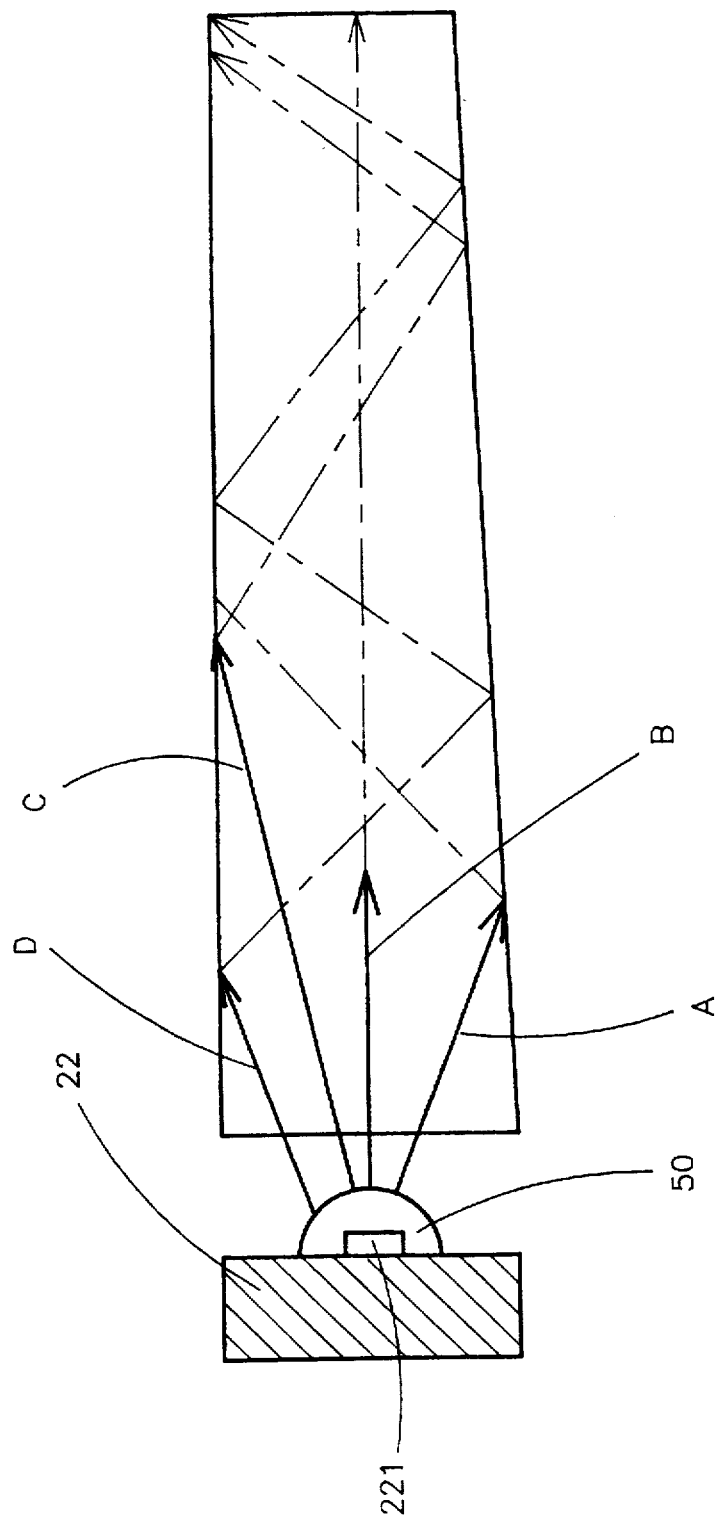
FIG. 4 is a schematic drawing, showing light rays refracted in the light guide according to the present invention.

Referring to FIGS. 3 and 4, each light emitting diode 221 of the second circuit board section 22 of the circuit board 20 is coated with a layer of silicon rubber 50, so that so that light rays A, B, C, D can be directly emitted from each light emitting diode 221 to the light guide 30. Because the light guide 30 is covered within the base frame 10 and the diffuser plate 40, light is evenly distributed through the light guide 30.

Referring to FIG. 2 again, the frosted top face 31 and frosted bottom face 32 of the light guide 30 are formed when the light guide 30 is injection-molded. Therefore, it is not necessary to process the top and bottom faces of the light guide 30 through a secondary processing process.

While only one embodiment of the present invention has been shown and described, it will be understood that various modifications and changes could be made thereon without departing from the spirit and scope of the invention disclosed.

What the invention claimed is:

1. A LED back light assembly comprising:

a base frame comprising a flat, rectangular receiving chamber, a plurality of first upright pins and first pin holes alternatively and transversely arranged at one end of said frame, and a plurality of second upright pins and second pin holes alternatively and transversely arranged at an opposite end of said frame;

a circuit board mounted within the receiving chamber of said base frame, said circuit board comprising a first circuit board section and a second circuit board section connected at right angles, said first circuit board section having a plurality of terminals respectively plugged into the first pin holes of said base frame, and a plurality of pin holes of said first circuit board section respectively coupled to the first upright pins of said base frame, said second circuit board section having a plurality of light emitting diodes mounted thereon and facing inwards toward the receiving chamber;

a light guide mounted within the receiving chamber of said base frame to guide light from said light emitting diodes; and a diffuser plate covered on said base frame over said light guide;

wherein said light guide comprises a frosted top face, a frosted bottom face, a corrugated bright front face facing said light emitting diodes, two end flanges at two opposite ends, said end flanges of said light guide having respective pin holes respectively coupled to the first upright pins and second upright pins of said base frame, and two transverse bevel faces at two opposite ends of said light guide below said end flanges guiding back diffused light rays to the light guide, said corrugated bright front face defining a plurality of longitudinally arranged furrows, which receive said light emitting diodes respectively.

2. The LED back light assembly of claim 1 wherein said base frame and said diffuser plate keep light from said light emitting diodes evenly diffused through said light guide.

\* \* \* \* \*